US007199546B2

(12) United States Patent
Nireki et al.

(10) Patent No.: US 7,199,546 B2
(45) Date of Patent: Apr. 3, 2007

(54) MOTOR STOP CONTROL DEVICE UTILIZABLE FOR GAMING MACHINE AND GAMING MACHINE USING THE SAME

(75) Inventors: Takao Nireki, Tokyo (JP); Yuuichirou Suzuki, Tokyo (JP)

(73) Assignee: Aruze Corp., Tokyo (JP)

( * ) Notice: Subject to any disclaimer, the term of this patent is extended or adjusted under 35 U.S.C. 154(b) by 0 days.

(21) Appl. No.: 10/940,754

(22) Filed: Sep. 15, 2004

(65) Prior Publication Data

US 2005/0083007 A1 Apr. 21, 2005

(30) Foreign Application Priority Data

Sep. 17, 2003 (JP) ............................ 2003-324446

(51) Int. Cl.
*H02P 8/00* (2006.01)

(52) U.S. Cl. ...................... 318/696; 318/685; 318/269; 318/272; 273/143 R; 273/148 R; 273/142 H; 463/16; 463/20

(58) Field of Classification Search ................ 318/685, 318/696, 268–272, 700
See application file for complete search history.

(56) References Cited

U.S. PATENT DOCUMENTS 4,481,454 A 11/1984 Otani
4,564,796 A * 1/1986 Yoshino et al. ............. 318/696
4,632,828 A * 12/1986 Carli .......................... 514/178
4,687,981 A * 8/1987 Okada ......................... 318/696
4,697,129 A 9/1987 Enami et al.
4,772,022 A 9/1988 Yoshitomi
4,858,932 A * 8/1989 Keane ......................... 463/21
4,889,339 A 12/1989 Okada
4,988,938 A 1/1991 Ito et al.
5,021,728 A 6/1991 Sato
5,062,006 A * 10/1991 Miura ........................ 358/421
5,938,529 A * 8/1999 Rodesch et al. .............. 463/20
5,988,638 A * 11/1999 Rodesch et al. ........ 273/143 R

FOREIGN PATENT DOCUMENTS

EP 0 676 859 A1 10/1995
GB 1 471 866 4/1977
JP 9-98599 4/1997
JP 10-71240 A 3/1998

OTHER PUBLICATIONS

European Search Report, Application No.: 04022041.0-1238-, dated Jun. 16, 2005.

* cited by examiner

*Primary Examiner*—Lincoln Donovan
*Assistant Examiner*—Tyrone Smith
(74) *Attorney, Agent, or Firm*—Rader, Fishman & Grauer PLLC

(57) ABSTRACT

It is disclosed the motor stop control device having the stepping motor 49 as the drive source of the reel 3 on which a plurality of symbols are formed, the motor stop control device being utilized in the reel-type gaming machine 1 and stopping the stepping motor 49 corresponding to the stop instruction from an external. When the stop instruction of the stepping motor 49 occurs based on the instruction from an external, the main CPU 31 drops the voltage value added to the stepping motor which is rotating at the constant speed to the voltage value lower than such voltage value and executes the stop process of the stepping motor 49 by 2-phase excitation.

6 Claims, 11 Drawing Sheets

FIG.5

≪REEL STOP CONTROL PROCESS≫

| POWER SOURCE UTILIZED WHEN REEL STOPS (POWER SOURCE A > POWER SOURCE B) | EXCITATION PROCESS |
|---|---|
| POWER SOURCE B | 2-PHASES ON |

MOTOR STOP CONTROL DEVICE UTILIZABLE FOR GAMING MACHINE AND GAMING MACHINE USING THE SAME

CROSS-REFERENCE TO THE RELATED APPLICATION (S)

This application is based upon and claims a priority from the prior Japanese Patent Application No. 2003-324446 filed on Sep. 17, 2003, the entire contents are incorporated herein by reference. This application is related to co-pending U.S. applications entitled "MOTOR STOP CONTROL DEVICE UTILIZABLE FOR REEL-TYPE GAMING MACHINE", filed on Apr. 29, 2004, "MOTOR DRIVE CONTROL DEVICE UTILIZABLE FOR GAMING MACHINE AND GAMING MACHINE USING THE SAME" filed on Sep. 9, 2004 and "MOTOR STOP CONTROL DEVICE FOR GAMING MACHINE AND GAMING MACHINE PROVIDED WITH THE MOTOR STOP CONTROL DEVICE", filed on Jul. 30, 2004. The co-pending applications are expressly incorporated herein by reference.

BACKGROUND OF THE INVENTION

1. Field of the Invention

The present invention relates to a motor stop control device utilized in a reel-type gaming machine and a gaming machine using the motor stop control device, the motor stop control device having a motor as a drive source of a reel on which a plurality of symbols are formed and stopping the motor corresponding to a stop instruction from an external.

2. Description of Related Art

Conventionally, in a symbol variable rotation device for a reel-type gaming machine (for example, a Japanese Pachi-slot machine), a reel directly connected to a rotor of a stepping motor (abbreviated as "direct drive manner") as shown in Japanese Unexamined Publication No. 10-71240. In the symbol variable rotation device utilizing the direct drive manner, all phases of the stepping motor are excited and a detent torque occurs in the stepping motor, thereby smooth stop of the reel is realized. Here, the larger the detent torque becomes the more smooth the reel rapidly stops.

However, in order that a designer designs the reel so as to smoothly stop, the designer has to adopt a precious stepping motor which generates not only a large drive torque but also a large detent torque. In other words, if it is adopted a cheap stepping motor which can generate only a drive torque necessary for drive start thereof, a size of the stepping motor itself is small, thus the detent torque becomes small. Accordingly, stop by all phase excitation cannot be done.

And since there is large imbalance in the detent torque due to each stepping motor, the balance between the detent torque and an inertia of the reel is broken and the stop position of the reel cannot be constantly retained. Therefore, an assembler has to select and use the stepping motor which has a detent torque within a predetermined range and cost of the stepping motor is increased due to that a yield goes down. Further, even if it is adopted the stepping motor having the detent torque within the predetermined range by the above selection, the detent torque of the stepping motor fluctuates more or less within the above predetermined range, therefore the stop position of the stepping motor does not become constant. Thus, in order to make the stop position of the stepping motor more precise, in other words, in order that imbalance of the detent torque does not affect the stop position, the assembler has to prepare the inertia of the reel by attaching a weight to the reel which is attached to the stepping motor and to prepare balance between the detent torque and the inertia in the combination of the stepping motor and the reel. Accordingly, there is a problem that cost of the stepping motor is further increased.

SUMMARY OF THE INVENTION

The present invention has been done to dissolve the above problems and has an object to provide a motor stop control device by which the reel can be smoothly stopped without depending upon a large detent torque and preciseness of the stop position of the reel can be raised without increasing cost of the stepping motor due to imbalance of the detent torque.

In order to accomplish the above object, according to one aspect of the present invention, it is provided a motor stop control device utilizable for a gaming machine with a reel on which a plurality of symbols are formed, the motor stop control device having a motor with a plurality of excitation phases to rotate the reel and a motor stop controller for stopping the motor based on a stop instruction, wherein the motor stop controller decreases a first voltage value added to the motor rotating at a constant speed to a second voltage value lower than the first voltage value when the stop instruction occurs and executes a stop control process of the motor by 2-phase excitation.

According to the above motor stop control device, the motor stop controller decreases a first voltage value added to the motor rotating at a constant speed to a second voltage value lower than the first voltage value when the stop instruction occurs and executes a stop control process of the motor by 2-phase excitation. Thereby, the reel can be smoothly stopped without depending upon the detent torque and preciseness of a stop position of the reel can be raised without increasing cost due to imbalance of the detent torque.

That is to say, since the first voltage value added to each excitation phase of the motor is changed to the second voltage value lower than the first voltage value, a current value running in each excitation phase becomes lower than that according to the first voltage value. Thereby, since the 2-phase excitation is executed based on the lower current value running in each excitation phase of the motor, a torque enough for holding the reel rotating is not generated. Thus, the reel is rotated against holding by the 2-phase excitation executed according to the lower current value and rotation speed of the reel is gradually reduced. Therefore, when the reel is stopped, the process for changing the first voltage value to the second voltage value lower than the first voltage value and the excitation process by the 2-phase excitation are executed, thereby the reel can be smoothly stopped without depending upon the detent torque. And since the stop control does not depend upon the detent torque with imbalance, it is not necessary to prepare balance between the detent torque and the inertia of the reel, therefore preciseness of the reel stop position can be raised without increasing cost thereof due to imbalance of the detent torque according to the motor stop control device.

And according to another aspect of the present invention, it is provided a gaming machine comprising:

a reel on which a plurality of symbols are formed;

a motor stop control device having a motor with a plurality of excitation phases to rotate the reel and a motor stop controller for stopping the motor based on a stop instruction;

wherein the motor stop controller decreases a first voltage value added to the motor rotating at a constant speed to a second voltage value lower than the first voltage value when the stop instruction occurs and executes a stop control process of the motor by 2-phase excitation.

According to the above gaming machine, the motor stop controller in the motor stop control device decreases a first voltage value added to the motor rotating at a constant speed to a second voltage value lower than the first voltage value when the stop instruction occurs and executes a stop control process of the motor by 2-phase excitation. Thereby, the reel can be smoothly stopped without depending upon the detent torque and preciseness of a stop position of the reel can be raised without increasing cost due to imbalance of the detent torque.

That is to say, since the first voltage value added to each excitation phase of the motor is changed to the second voltage value lower than the first voltage value, a current value running in each excitation phase becomes lower than that according to the first voltage value. Thereby, since the 2-phase excitation is executed based on the lower current value running in each excitation phase of the motor, a torque enough for holding the reel rotating is not generated. Thus, the reel is rotated against holding by the 2-phase excitation executed according to the lower current value and rotation speed of the reel is gradually reduced. Therefore, when the reel is stopped, the process for changing the first voltage value to the second voltage value lower than the first voltage value and the excitation process by the 2-phase excitation are executed, thereby the reel can be smoothly stopped without depending upon the detent torque. And since the stop control does not depend upon the detent torque with imbalance, it is not necessary to prepare balance between the detent torque and the inertia of the reel, therefore preciseness of the reel stop position can be raised without increasing cost thereof due to imbalance of the detent torque according to the motor stop control device.

As mentioned, according to the motor stop control device of the present invention, the reel can be smoothly stopped without depending upon the large detent torque and preciseness of the reel stop position can be raised without increasing cost thereof due to imbalance of the detent torque.

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings,

FIG. 3 is an explanatory view showing the reel and a lamp case.

FIG. 5 is an explanatory view to explain a reel stop control process done in the embodiment, FIG. 6 is a timing chart to explain the reel stop control process done in the embodiment.

DETAILED DESCRIPTION OF THE PREFERRED EMBODIMENTS (Basic Construction of Motor Drive Control Device)

Figure 1:
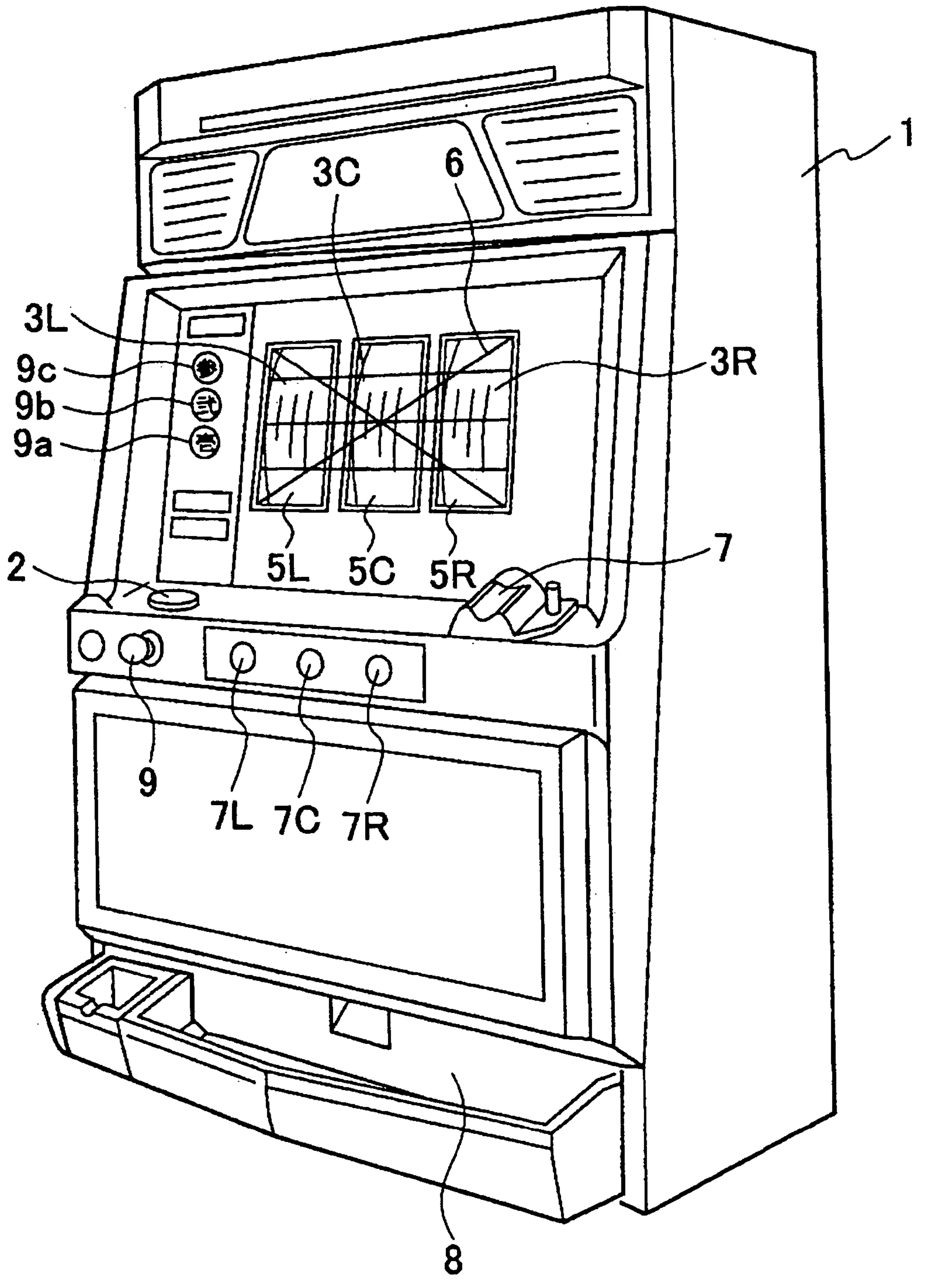
FIG. 1 is a perspective view of a gaming machine according to the embodiment.

The motor drive control device of the embodiment will be described with reference to the drawings. FIG. 1 is a perspective view of a reel-type gaming machine according to the embodiment.

As shown in FIG. 1, in front of a cabinet forming a whole construction of the reel-type gaming machine 1, three panel display windows 5L, 5C, 5R are formed. Reels 3L, 3C, 3R constructing a reel unit are seen and recognized through the panel display windows 5L, 5C, 5R, respectively. And on the panel display windows 5L, 5C, 5R, three pay lines 6 are described along three horizontal directions and two pay lines 6 are described along two oblique directions. These pay lines 6 are made effective according to the number of coins inserted through an insertion slot 7 and the number of pay lines 6 are determined.

Each of the reels 3L, 3C, 3R starts to rotate when a player inserts coins in the insertion slot 7 and operates a start lever 9. And when the player presses stop buttons 7L, 7C, 7R arranged corresponding to the reels 3L, 3C, 3R respectively, rotation of the reels 3L, 3C, 3R is stopped. Further, based on a symbol combination of each of reels 3L, 3C, 3R which are seen and recognized through each of the panel display windows 5L, 5C, 5R when rotation of the reels 3L, 3C, 3R is stopped, a winning mode is determined. And when winning is obtained, coins the number of which corresponds to the winning mode are paid out to a coin tray 8.

Hereinafter, for convenience sake of explanation, although description will be done to limit to the left panel display window 5L (merely abbreviated as "the panel display window 5" hereinafter), the left reel 3L (merely abbreviated as "the reel 3" hereinafter), the left support plate 80L (merely abbreviated as "the support plate 80 hereinafter), the left stepping motor 49L (merely abbreviated as "the stepping motor 49 hereinafter), among three panel display windows 5L, 5C, 5R, three reels 3L, 3C, 3R, three support plates 80L, 80C, 80R, three stepping motors 49L, 49C, 49R, the other panel display windows 5C, 5R, the other reels 3C, 3R, the other support plates 80C, 80R, the other stepping motors 49C, 49R have the same construction as those of the panel display window 5L, the reel 3L, the support plate 80L, the stepping motor 49L, so long as explanation is not especially referred.

Figure 2:
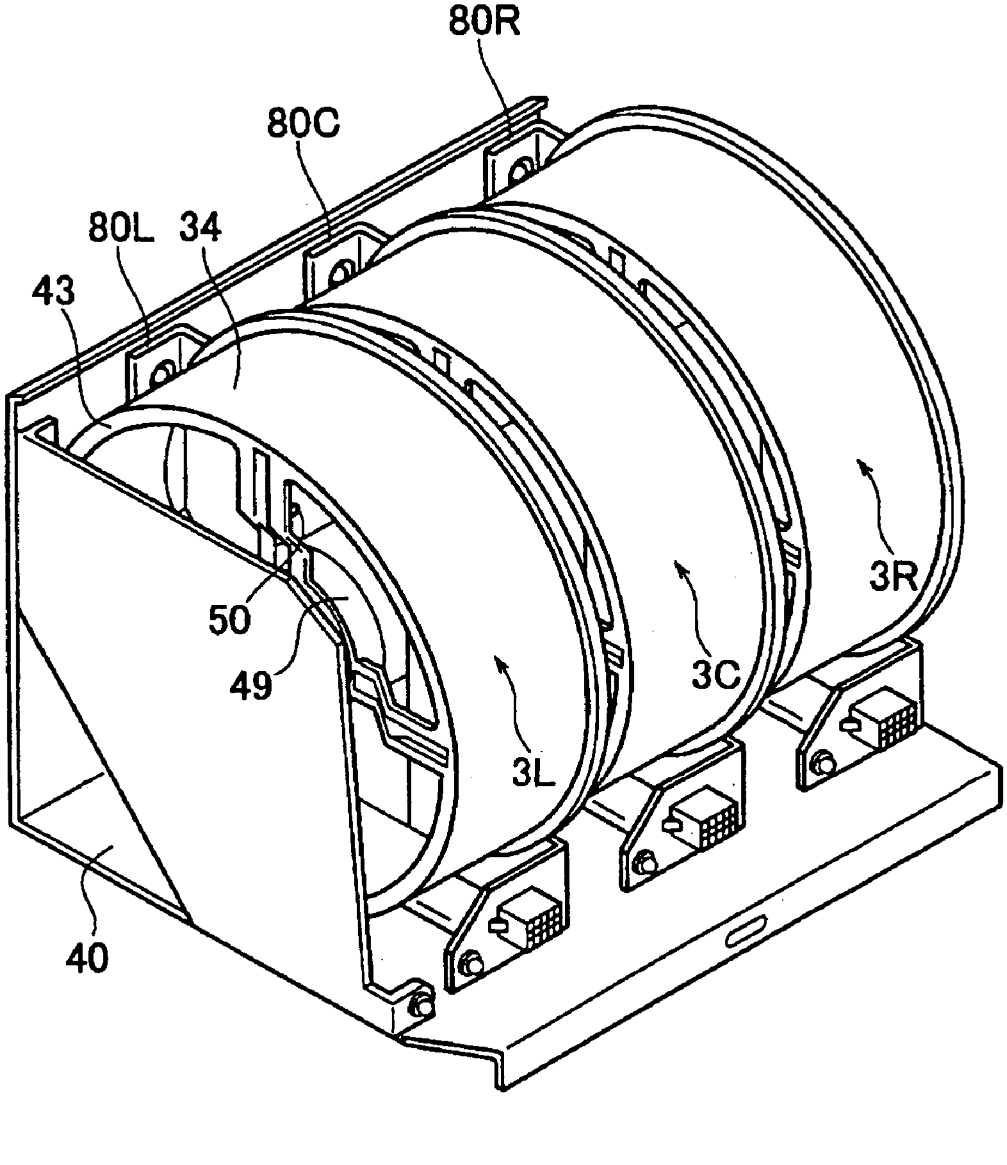
FIG. 2 is a perspective view showing a construction of reels when obliquely seeing the reels in the embodiment.

FIG. 2 is a perspective view showing the construction of the reel unit arranged within the panel display windows 5L, 5C, 5R. As shown in FIG. 2, the reel 3 is supported to the frame 40 through the support plate 80. In the reel 3, on an outer periphery of the reel drum 43, a reel strip 34 is adhered. And on an outer surface of the reel strip 34, a plurality of symbols are described.

To the support plate 80, the stepping motor 49 is arranged and the reel 3 is rotated based on that the stepping motor 49 is driven. A drive shaft of the stepping motor 49 according to the embodiment is directly pressed in a center hole of the reel 3 (direct drive manner).

FIG. 3 is an explanatory view showing a construction of the reel 3. As shown in FIG. 3, in the reel drum 43 positioned behind the reel strip 34, a lamp case 51 is arranged. And in each of three parts formed in the lamp case 51, a back lamp 52*a* is arranged. The back lamp 52*a* is constructed from a full-color LED (Light-emitting diode) capable of emitting large light quantity, and is assembled on a circuit board 53. This circuit board 53 is arranged behind the lamp case 51.

A photosensor 54 is arranged on the support plate 80. The photosensor 54 detects that a sensor plate 50 formed in the reel drum 43 passes the photosensor 54 according to rotation of the reel drum 43.

Each of the back lamps 52*a* is controlled so as to turn on and off by a lamp drive circuit 45. Based on that each of the back lamps 52*a* is turned on, three symbols, which are positioned in front of the back lamps 52*a*, among plural symbols described on the reel strip 34, are independently illuminated from the behind thereof Thereby, three symbols are projected on each of the panel display windows 5L, 5C, 5R.

Figure 3A:
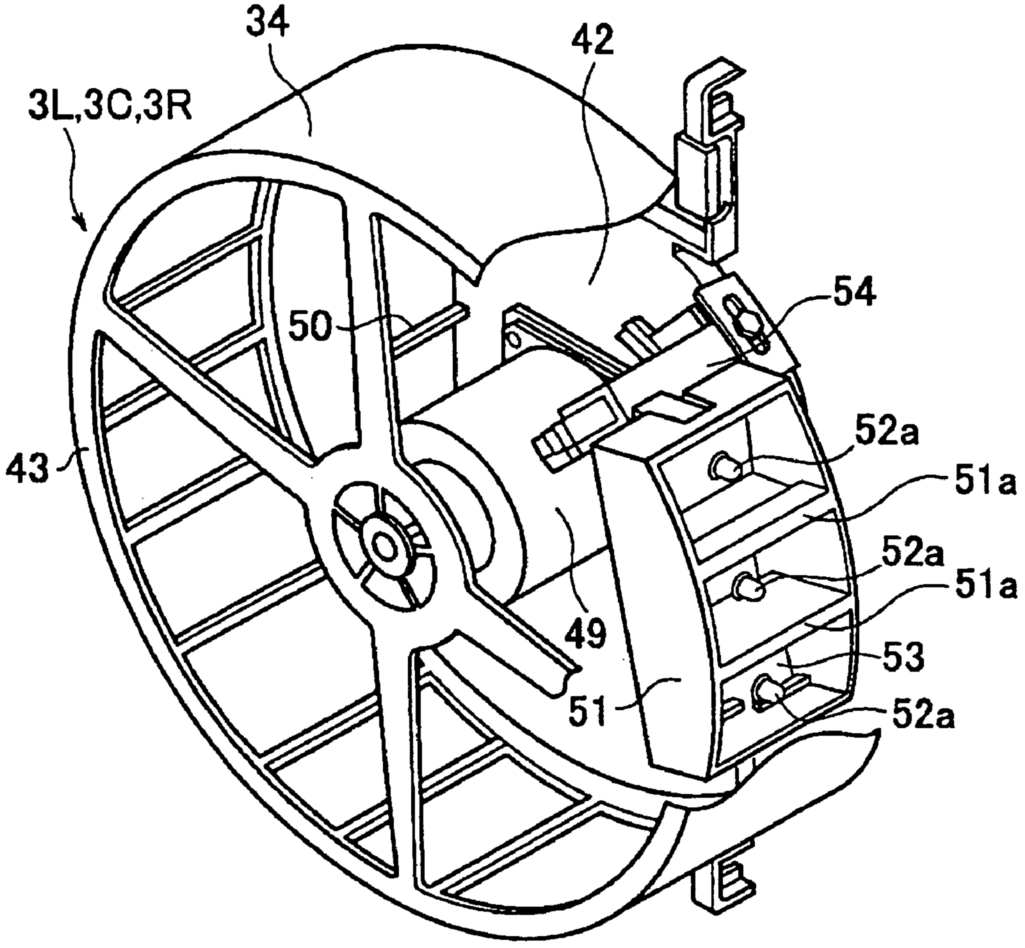
FIG. 3A is a perspective view of the reel a part of which is broken and FIG. 3B is a perspective view of another lamp case.
Figure 3B:
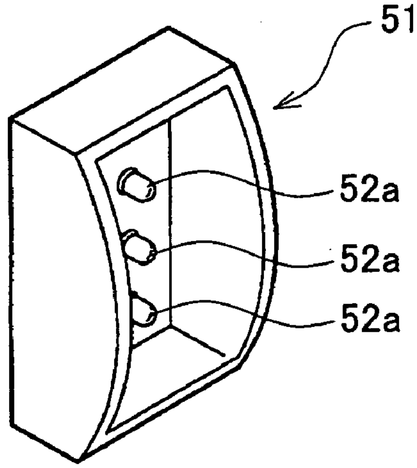

In FIG. 3A, although each of the back lamps 52*a* is independently arranged in each of three parts partitioned by three partition walls 51*a*, the partition walls 51*a* may not be formed as shown in FIG. 3B. By removing the partition walls 51*a*, light emitted from the back lamps 52*a* is not reflected by the partition walls 51*a*, thereby brightness of the back lamps 52*a* can be improved.

Figure 4:
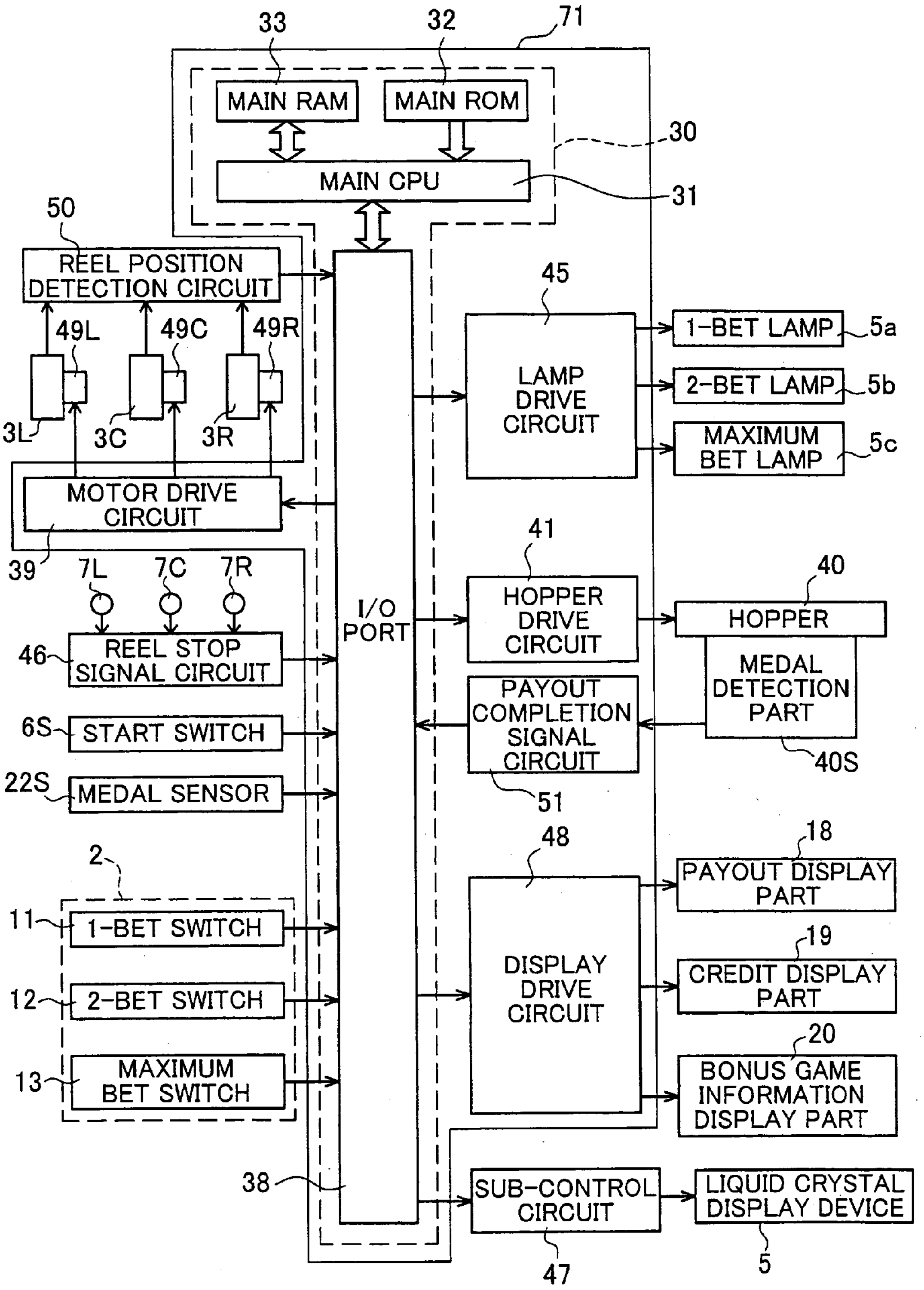
FIG. 4 is a block diagram of the gaming machine in the embodiment.

FIG. 4 is a block diagram indicating an electrical construction of the reel-type gaming machine 1, including the motor stop control device. The motor stop control device is provided with the stepping motor 49, as the drive source of the reel 3 having a plurality of symbols, and drives or stops the stepping motor 49 corresponding to an instruction command (for example, press of the stop buttons 7l, 7C, 7R) transmitted from an external.

As shown in FIG. 4, in a microcomputer 71, there are provided a main CPU 31 functioning as a main controller for mainly controlling and calculating, a main ROM 32 for storing programs and various data, a main RAM 33 utilized for data reading and writing, and a random number generator (not shown) for generating predetermined random number values.

Input parts such as a start switch 6S for detecting operation of the start lever 9, a reel stop signal circuit 46 for detecting operation of the stop buttons 7L, 7C, 7R, an input part 2 including BET switches 11~13 for betting credited coins by pressing thereof and output parts such as a motor drive circuit 39, a lamp drive circuit 45, a hopper drive circuit 41 and a display drive circuit 48 are connected to the main CPU 31.

The main CPU 31 functions as the winning combination determination device for determining (conducting the lottery process) a predetermined symbol combination as the winning combination. Concretely, the main CPU 31 determines the predetermined symbol combination (for example, the symbol combination of "BELLS") as the winning combination when operation of the start lever 9 is detected by the start switch 6S.

The main CPU 31 functions as a game value giving device for giving a specific game value to the player in a case that a specific winning mode (for example, the winning combination of "Replay-Replay-Replay" and the like) is stopped and displayed on the reel 3 based on that the determined winning combination is a specific winning combination (for example, the winning combination of "BB", "RB").

And when the stop instruction of the stepping motor 49 occurs based on an instruction from an external, the main CPU 31 drops the voltage value added to the stepping motor 49 which is rotating at a constant speed to a lower voltage value than such voltage value and executes stop control (reel stop control process) of the stepping motor 49 by 2-phase excitation. Thus, the main CPU 31 functions as the motor stop control device.

Here, FIG. 5 is an explanatory view showing the reel stop control process. As shown in FIG. 5, the reel stop control process includes the drive power source selection process for the stepping motor 49 which is utilized when the reel 3 is stopped and the excitation process corresponding the process which is done till the reel 3 is completely stopped from termination of the stop process shown in FIG. 6.

This stop process shown in FIG. 6 means the process which is done till the excitation process is started after any one of the stop buttons 7 is pressed. In the embodiment, the stop process includes the symbol process in which the draw-in process that the main CPU 31 draws the predetermined symbols internally won in the pay line or the slide process that the main CPU 31 slides the predetermined number of symbols so that the predetermined winning combination do not stop along the pay line is done till just before the reel 3 is stopped at the target stop position after the stop buttons 7 are pressed. And in the embodiment the drive power source is selected when the stop process is terminated.

FIG. 6 is an explanatory view showing a timing chart of the reel stop control process.

Figures 6A, 6B:
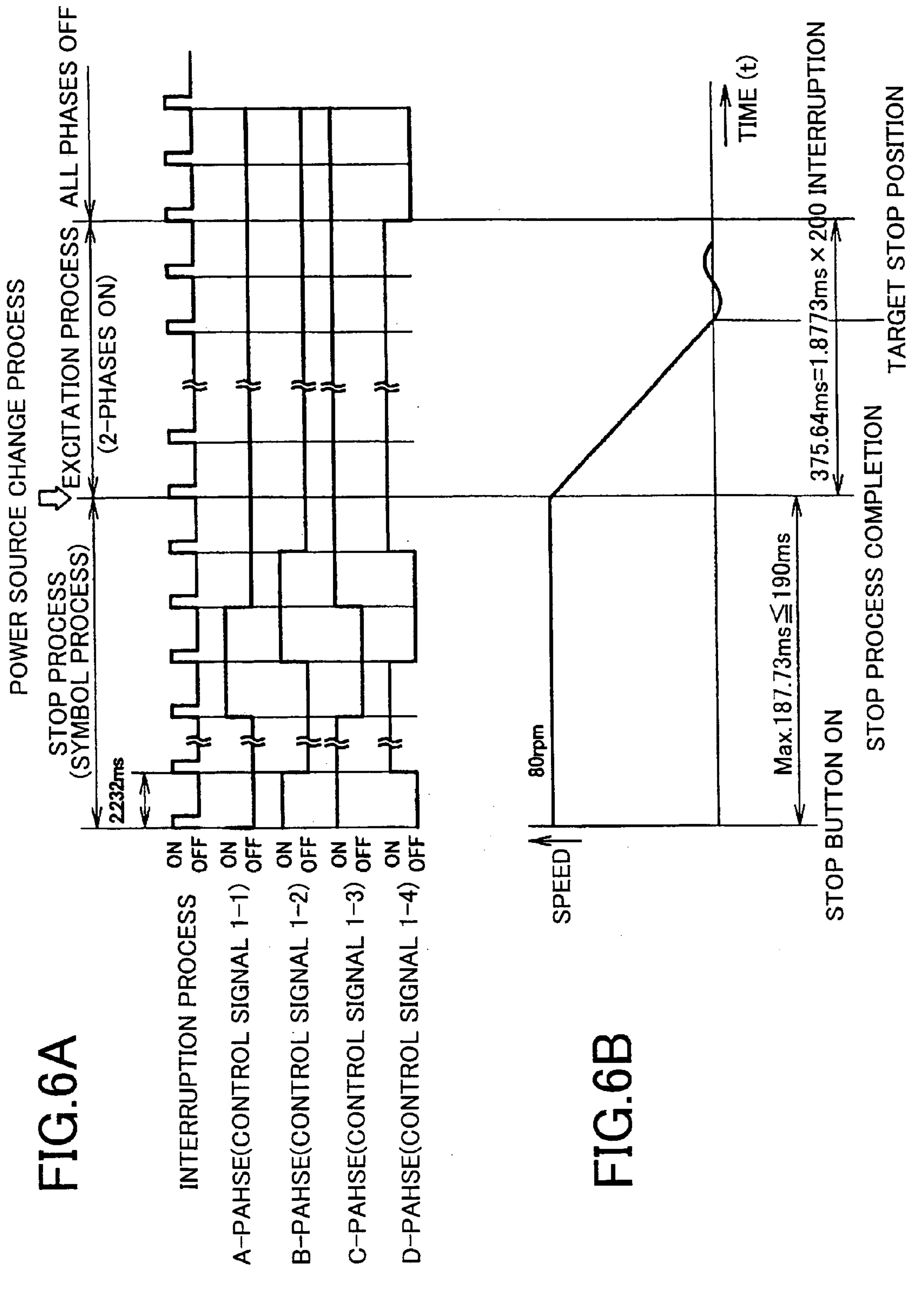
FIG. 6A is an explanatory view indicating pulses in each phase, the pulses being transmitted from a main CPU to a motor drive circuit during a stop process and an excitation process
FIG. 6B is an explanatory view indicating a rotation speed of the reel against time when the motor drive circuit drives the stepping motor.

FIG. 6A is an explanatory view indicating pulses in each phase, the pulses being transmitted from the main CPU 31 to the motor drive circuit 39 during the stop process and the excitation process. Each of the control signals 1-1 to 1-4 corresponds to a current running to the bases of the transistors TR1 to TR4 in the motor drive circuit 39 mentioned later.

FIG. 6B is an explanatory view indicating the rotation speed of the reel 3 against time when the motor drive circuit 39 drives the stepping motor 49 based on the pulses in each phase received from the main CPU 31. In the embodiment, the time indicated in FIG. 6B corresponds to the time indicated in FIG. 6A.

In the above reel stop control process, when the stop instruction of the stepping motor 49 occurs based on the instruction from an external, the main CPU 31 changes the power source A (for example, 12V) utilized for the stepping motor 49 rotating at the constant speed to the power source B (for example, 5V) lower than the power source A, at the time that the stop process is terminated (drive power source change process). Thereafter, the main CPU 31 executes the stop control of the stepping motor 49 by 2-phase excitation.

That is to say, in the reel stop control process, as shown in FIG. 6A and 6B, after the stop button 7 is pressed the main CPU 31 executes the stop process including the drive power source change process. And the main CPU 31 executes the excitation process by 2-phase excitation, thereafter the reel 3 is stopped.

In the above excitation process, the main CPU 31, for example, outputs pulses (control signal 1-3 and the control signal 1-4) to the bases of the transistors TR3 and TR4 arranged in the motor drive circuit 39 in order to excite the C-phase and the D-phase after the stop process is terminated. The transistors TR3 and TR4, for example, excite the C-phase and the D-phase (2-phase excitation) for only a predetermined time interval. Based on that this excitation process is continued for the predetermined time interval, the stepping motor 49 is completely stopped.

Here, as shown in FIG. 6B, the line described between the stop process completion and the target stop position does not depend upon the detent torque different from the stop process conventionally done only by all phase excitation, therefore the target stop position is not fluctuated. This is because the stepping motor 49 does not depend upon the detent torque with imbalance based on that the above drive power source change process is executed and the excitation process is executed by 2-phase excitation.

That is to say, in the reel stop control process, when the excitation process is conducted, the power source is changed to the power source B in which the voltage value added to each phase (L1 to L4) is lower than that in the power source A, thereby the current value running in each phase becomes lower than that in the power source A. Accordingly, corresponding to that the current value running in the excitation phases of the stepping motor 49 becomes lower, the excitation process is executed and the rotation speed of the reel 3 is decreased. Thus, since the drive power source change process and the excitation process are executed, the reel 3 is smoothly stopped by a smaller braking force than the detent torque by the power source A.

The motor drive circuit 39 drives or stops the stepping motor 49 based on commands from the main CPU 31. Here, the stepping motor 49 is 4-phase motor and has four drive coils through A-phase to D-phase. And in the embodiment, each phase is defined so as to stand in order A-phase, B-phase, C-phase and D-phase in anti-clockwise direction. Further, A-phase and C-phase or B-phase and D-phase form one pair and current running in one phase in the one pair of two phases has the reverse phase different from current running in the other phase in the one pair.

The motor drive circuit 39 serially excites the drive coil in each phase based on commands from the main CPU 31, thereby the rotor in the stepping motor 49 is driven to rotate.

Figure 7:
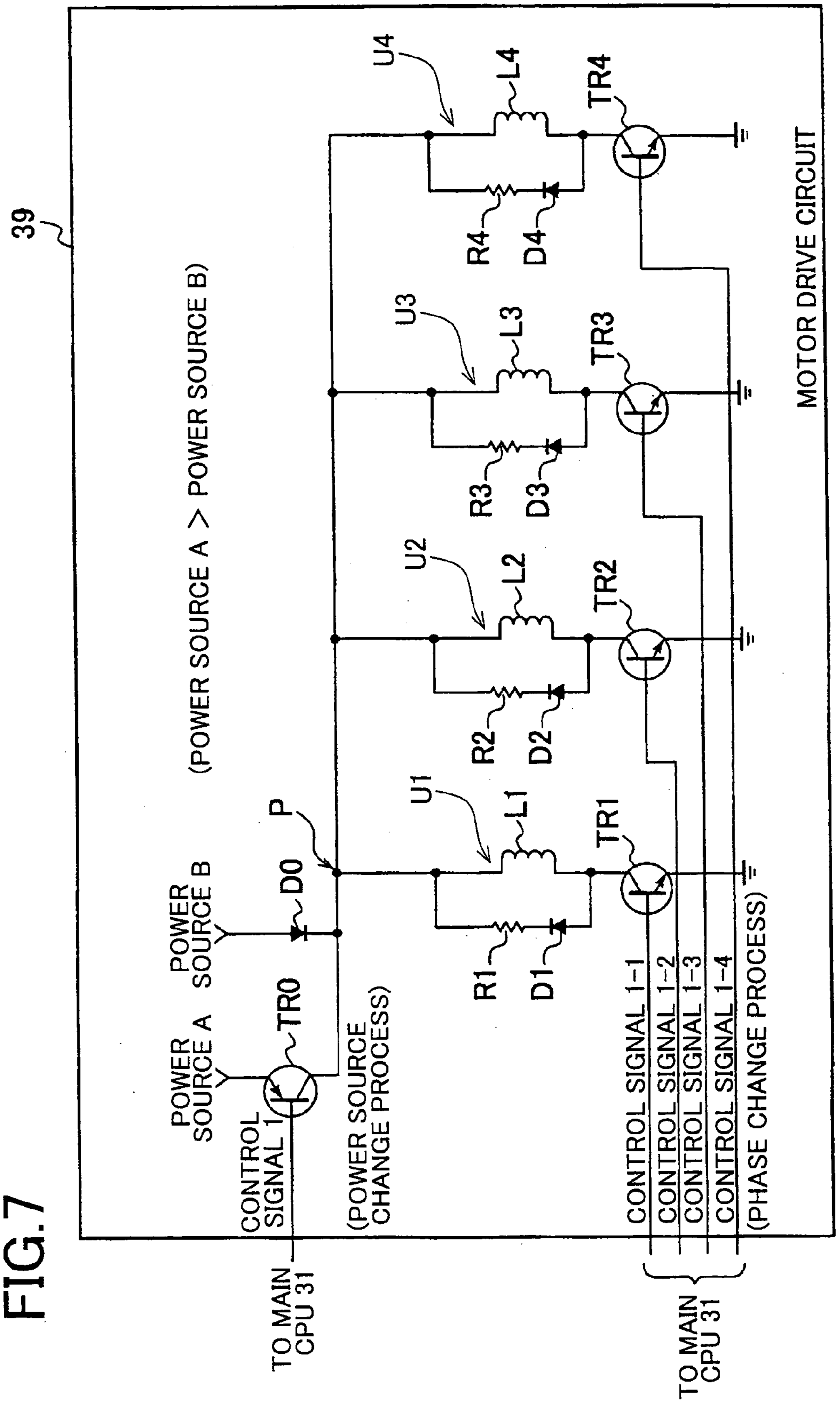
FIG. 7 is a circuit diagram showing an inner construction of the motor drive circuit.

FIG. 7 is a circuit diagram showing an inner construction of the motor drive circuit 39. As shown in FIG. 7, in the motor drive circuit 39, there are provided the power source A, the power source B, the diode D0 an anode of which is connected to the power source B and the transistor TR0 an emitter of which is connected to the power source A and a collector of which is connected to a cathode of the diode D0. When the current runs to a base of the transistor TR0 (when the transistor TR0 is turned on), the power source A is added to the point P. On the other hand, when the current does not run to the base of the transistor TR0 (when the transistor TR0 is turned off), the power source B is added to the point P. Thereby, the transistor TR0 is turned off, the transistor TR0 being turned on while the stepping motor 49 is rotated by the power source A at the constant speed, thus the power source is changed from the power A to the power B at the point P (drive power source change process).

And in the motor drive circuit 39, it is provided a reel stop unit U1 constructed from a resistor R1 one end of which connected to the collector of the transistor TR0, an reactance L1 one end of which is connected to the collector of the transistor TR0, a diode D1 a cathode of which is connected to the other end of the resistor R1 and an anode of which is connected to the other end of the reactance L1 and a transistor TR1 a collector of which is connected to the other end of the reactance L1 and an emitter of which is grounded. And the reel stop units U2 to U4 each of which has the same construction as the reel stop unit U1 are connected parallel to the reel stop unit U1, respectively.

And when the control signals 1-1 to 1-4 respectively run to each of the bases of transistors TR1 to TR4 which are provided in the reel stop units U1 to U4, the phase corresponding to each of the transistors TR1 to TR4 is excited.

The excitation process by 2-phase excitation is, for example, the process that the main CPU 31 runs the control signals 1-3 and 1-4 to the transistors TR3 and TR4, respectively. And the excitation process by all phase excitation is the process that the main CPU 31 runs the control signals 1-1 to 1-4 to the transistors TR1 to TR4, respectively. The excitation phase is changed (phase change process) based on that the main CPU 31 changes the present control signal to the other control signal.

(Reel Stop Control Method by the Motor Drive Control Device)

Figure 8:
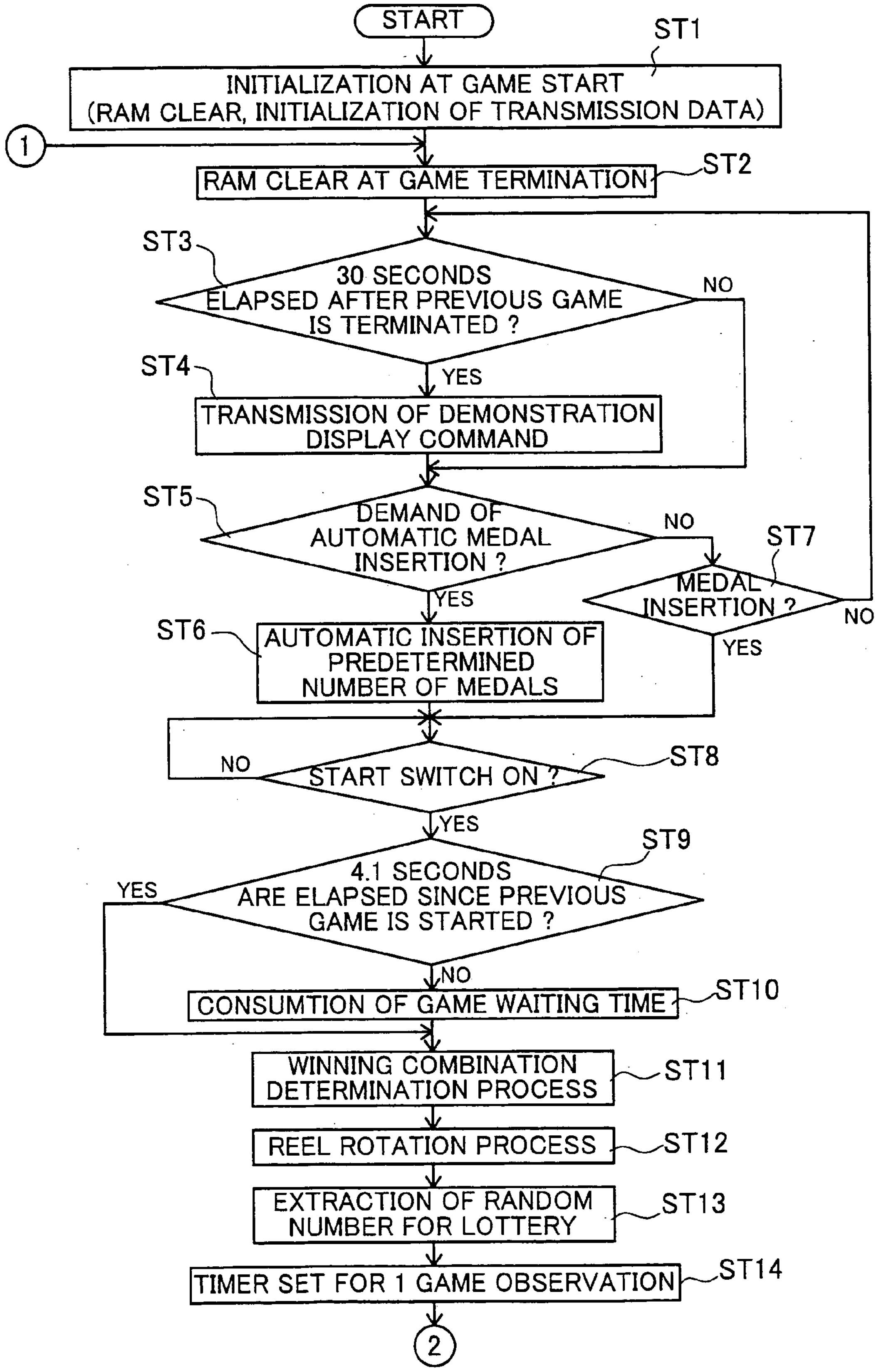
FIG. 8 is a flowchart showing operation of the motor drive control device, in the embodiment.
Figure 9:
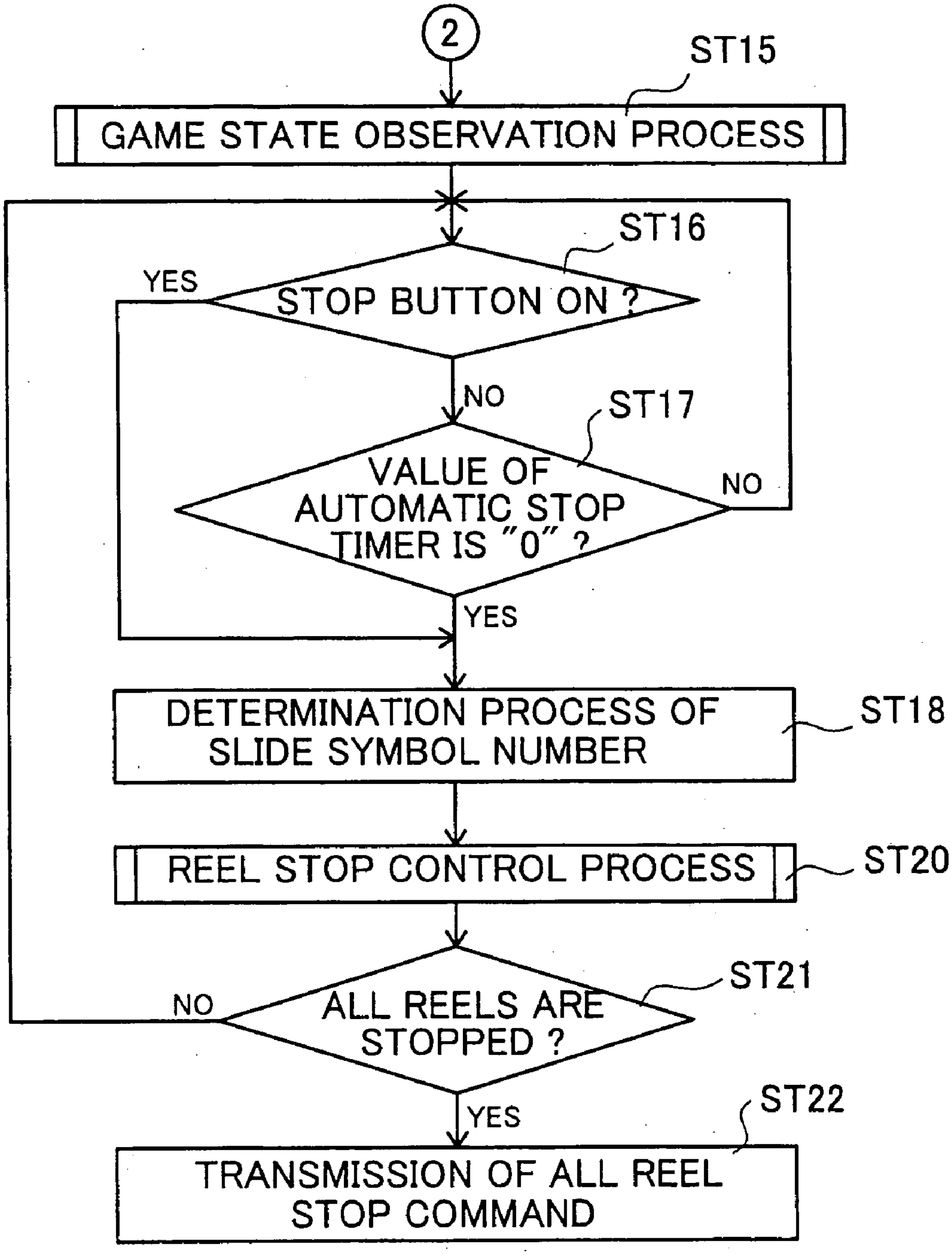
FIG. 9 is a flowchart showing operation of the motor drive control device, the operation being executed continuously to the operation shown in FIG. 8, in the embodiment.
Figure 10:
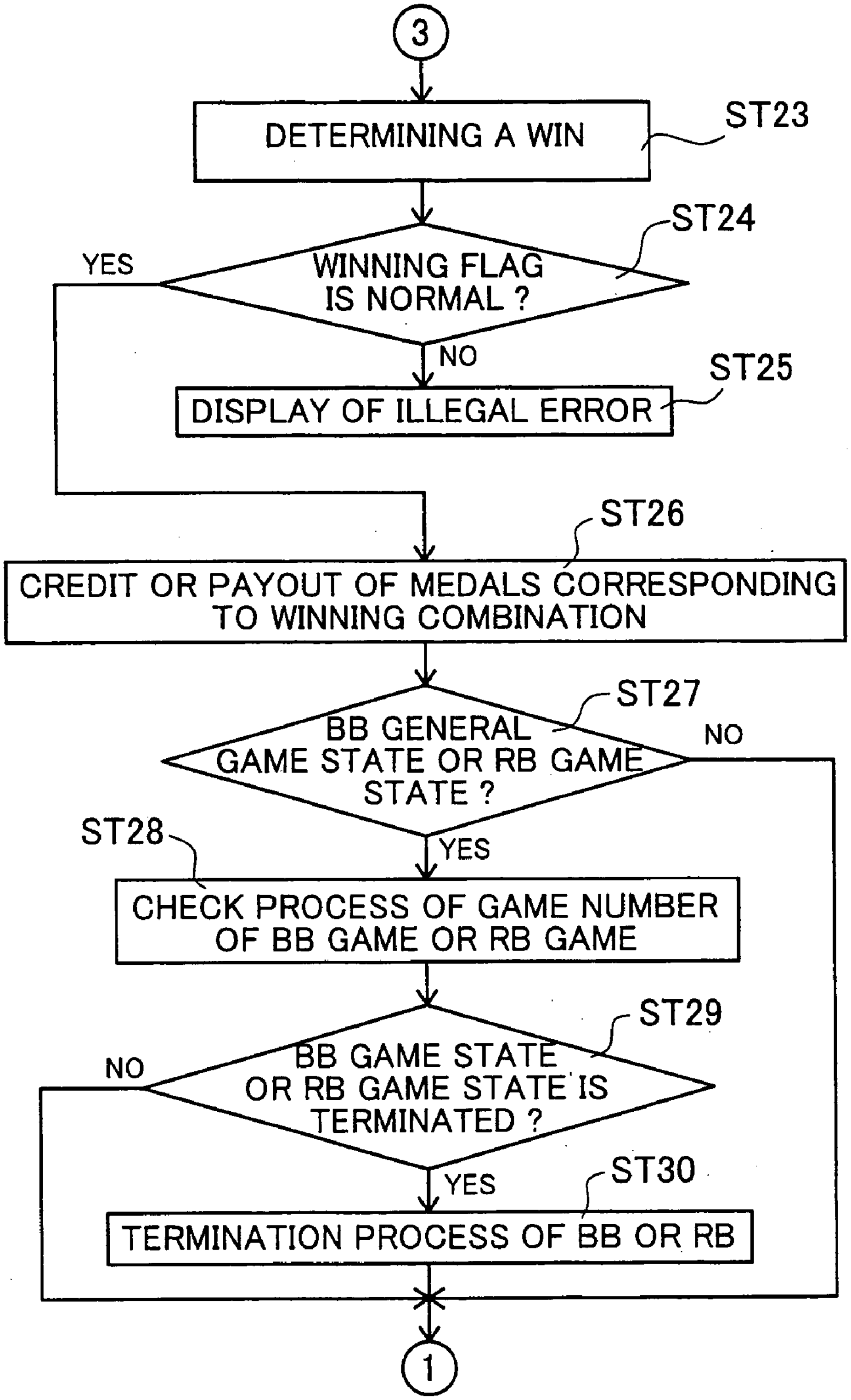
FIG. 10 is a flowchart showing operation of the motor drive control device, the operation being executed continuously to the operation shown in FIG. 9, in the embodiment.

The reel stop control method by the motor drive control device constructed according to the above will be executed by the following procedures. FIGS. 8 to 10 are flowcharts showing operation of the motor drive control device.

As shown in FIG. 8, in step 1 (abbreviated as "ST1" hereinafter), the main CPU 31 initializes predetermined data (data stored in the main RAM 33, transmission data and the like).

In ST2, the main CPU 31 erases the data stored in the main RAM 33 at the time that the previous game is terminated. Concretely, the main CPU 31 erases parameters utilized in the previous game from the main RAM 33 and writes parameters utilized in the next game in the main RAM 33.

In ST3, the main CPU 31 determines whether or not 30 seconds are elapsed since the previous game is terminated (all reels 3L, 3C, 3R are stopped). In a case that 30 seconds are elapsed, the main CPU 31 executes the process in ST4, and on the other hand, if 30 seconds are not elapsed, the main CPU 31 executes the process in ST5.

Here, in ST4, the main CPU 31 transmits "demonstration display command" to display demonstration image to a sub-control circuit 47.

In ST5, the main CPU 31 determines whether or not the "replay", which is one of the winning combinations, is won in the previous game. In a case that the "replay" is won, the main CPU 31 executes the process in ST6, and if the "replay" is not won, the main CPU 31 executes the process in ST7.

Here, in ST6, the main CPU 31 automatically inserts a predetermined number of medals based on that the "replay" is won.

In ST7, the main CPU 31 determines whether or not medals are inserted by the player. Concretely, the main CPU 31 determines whether or not the switch signal is input from the medal sensor 22S or one of the BET switches 2*a*~2*c*. And in a case that such switch signal is input to the main CPU 31, the main CPU 31 executes the process in ST8. On the other hand, in a case that such switch signal is not input to the main CPU 31, the main CPU 31 executes the process in ST3.

In ST8, the main CPU 31 determines whether or not the star lever 9 is operated by the player. Concretely, the main CPU 31 determines whether or not the switch signal is input from the start switch 6S. And in a case that the switch signal is input from the start switch 6S, the main CPU 31 executes the process in ST9.

In ST9, the main CPU 31 determines whether or not 4.1 seconds are elapsed since the previous game is started. And in a case that 4.1 seconds are elapsed, the main CPU 31 executes the process in ST11, and on the other hand, in a case that 4.1 seconds are not elapsed, the main CPU 31 executes the process in ST10.

In ST10, the main CPU 31 invalidates the input from the start switch 6S till 4.1 seconds are elapsed since the previous game is started.

In ST11, the main CPU 31 determines the predetermined symbol combination as the winning combination based on a lottery result.

In ST12, the main CPU 31 transmits the instruction command to the motor drive circuit 39 so that the reels 3 are rotated.

In ST13, the main CPU 31 extracts the random number which is utilized for various determinations.

In ST 14, the main CPU 31 sets a predetermined time to the 1 game observation timer. Here, the 1 game observation timer includes an automatic stop timer to which a predetermined time is set in order to automatically stop the reels 3 without stop operation by the player.

In ST15, the main CPU 31 conducts the game state observation process.

In ST16, the main CPU 31 determines whether or not the stop buttons 7L, 7C, 7R are operated by the player. Concretely, the main CPU 31 determines whether or not the input from the reel stop signal circuit 46 is "on". And if such input from the reel stop signal circuit 46 is "on", the main CPU 31 shifts the procedure to ST 18. On the other hand, if the input from the reel stop signal circuit 46 is "off", the main CPU 31 shifts the procedure to ST17.

In ST17, the main CPU 31 determines whether or not the value of the automatic stop timer is "0". And if such value is "0", the main CPU 31 conducts the process in ST18. On the other hand, if such value is not "0", the main CPU 31 conducts the process in ST17.

In ST18, the main CPU 31 determines the number of slide symbols.

In ST20, the main CPU 31 conducts the process to stop the reels 3. Detailed description thereof will be done hereinafter.

In ST21, the main CPU 31 determines whether or not all reels 3 are stopped. And if all reels 3 are stopped, the main CPU 31 conducts the process in ST21. On the other hand, if all reels 3 are not stopped, the main CPU 31 conducts the process in ST16.

In ST22, the main CPU 31 sets the command indicating that all reels 3 are stopped.

In ST23, the main CPU 31 conducts determination of a win (the winning combination). Here, the determination of the win (the wining combination) means that the winning flag is set in order to distinguish the winning combination based on the stop mode of the symbols along the panel display windows 5L, 5C, 5R. Concretely, the main CPU 31 distinguish the winning combination based on the code numbers of the symbols stopped along the center pay line and the winning combination determination table (not shown).

In ST24, the main CPU 31 determines whether or not the winning flag is normal. And if the winning flag is normal, the main CPU 31 conducts the process in ST26. On the other hand, if the winning flag is not normal, the main CPU 31 conducts the process in ST 25.

In ST25, the main CPU 31 conducts the display of illegal error.

In ST26, the main CPU 31 stores or pays out the medals corresponding to the winning combination.

In ST27, the main CPU 31 determines whether game condition is the "BB general game state" or the "RB game state". And if game condition is the "BB general game state" or the "RB game state", the main CPU 31 conducts the process in ST28. On the other hand, if game condition is not the "BB general game state" or the "RB game state", the main CPU 31 terminates procedure.

In ST28, the main CPU 31 checks the number of the BB game and the number of the RB game number. In this process, for example, the game number of the "BB general game state", the occurrence number of the "RB game state" in the "BB general game state", the game number in the "RB game state" and the winning number of times in the "RB game state" are checked.

In ST29, the main CPU 31 determines whether or not the "BB general game state" or the "RB game state" is terminated. And if games in the "BB general game state" or the "RB game state" are terminated, the main CPU 31 conducts the process in ST30. On the other hand, if games in the "BB general game state" or the "RB game state" are not terminated, the main CPU 31 conducts the process in ST2.

In ST30, the main CPU 31 clears the work area in the main RAM 33, the work area being used in the "BB general game state" or the "RB game state".

Figure 11:
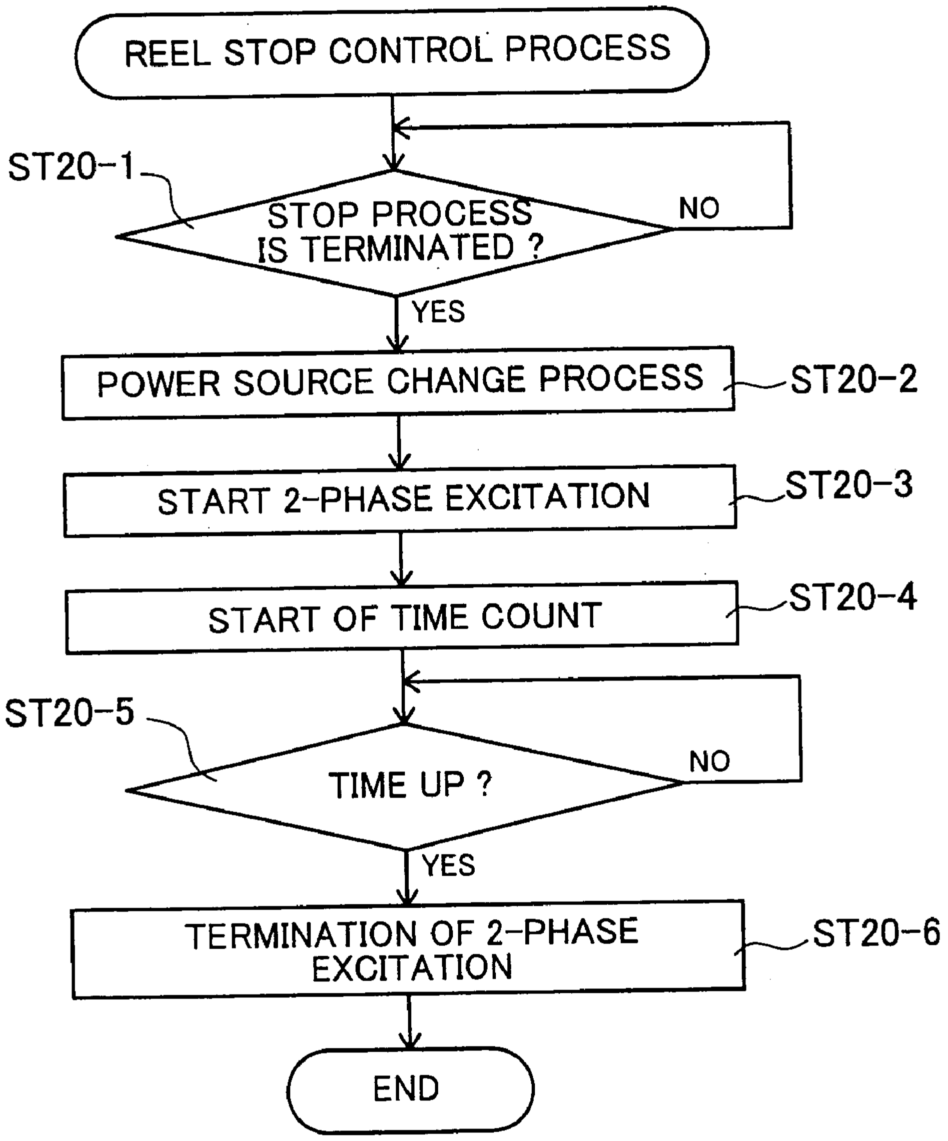
FIG. 11 is a flowchart showing operation of the reel stop control process.

FIG. 11 is a flowchart showing procedures in the reel stop control process in ST20.

As shown in FIG. 11, in ST20-1, the main CPU 31 determines whether or not the stop process is terminated. And when the main CPU 31 determines that the stop process is not terminated, the main CPU 31 again conducts the process in ST20-1. And when the main CPU 31 determines that the stop process is terminated, procedure shifts to ST20-2.

In ST20-2, the main CPU 31 changes the power source A added to the stepping motor 49 which is rotating at the constant speed, to the power source B the voltage value of which is lower than that of the power source A.

In ST20-3, the main CPU 31 starts the excitation process by 2-phase excitation.

In ST20-4, the main CPU 31 counts the time during which the excitation process by 2-phase excitation is executed.

In ST20-5, the main CPU 31 determines whether or not the time counted in ST20-4 exceeds a predetermined time. When the main CPU 31 determines that the counted time does not exceed the predetermined time, the main CPU 31 repeats this process in ST20-5. And when the main CPU 31 determines that the counted time exceeds the predetermined time, procedure shifts to ST20-6.

In ST20-6, the main CPU 31 terminates the excitation process by 2-phase excitation.

Here, the present invention is not limited to the above embodiment and various modifications may be done within the scope of the present invention. For example, in the above embodiment, although the stop control of the reels 3L, 3C, 3R (the stop control of the stepping motor 49) is conducted based on the signal output from the reel stop signal circuit 46 when any one of the stop buttons 7L, 7C, 7R is pressed, the present invention is not limited. As the trigger to conduct the above stop control, various triggers may be utilized.

(Operation and Effect by the Motor Stop Control Device)

According to the motor stop control device of the embodiment, when the stop instruction of the stepping motor 49 occurs based on the instruction from an external, the main CPU 31 drops the voltage value added to the stepping motor rotating at the constant speed to the voltage value lower than such voltage value and executes the stop control of the stepping motor 49 by 2-phase excitation, thereby the reel 3 can be smoothly stopped and cost of the stepping motor 49 can be reduced.

That is to say, since the voltage value added to each phase of the stepping motor 49 is changed to the power source B the voltage value of which is lower than that of the power source A, the current value running in each phase also becomes lower than that in the power source A. Thereby, based on that the current running in each excitation phase of the stepping motor 49 becomes lower, the motor stop control device can weak the holding torque even by utilizing the excitation process by 2-phase excitation. Accordingly, when the reel 3 is stopped, the process for changing to the lower power source and the excitation process by 2-phase excitation are executed, thereby the motor stop control device can smoothly stop the reel 3 without depending upon the stop by the detent torque.

What is claimed is:

1. A motor stop control device utilizable for a gaming machine with a reel on which a plurality of symbols are formed, the motor stop control device having a motor with a plurality of excitation phases to rotate the reel and a motor stop controller for stopping the motor based on a stop instruction, the motor stop control device comprising:

a first power source for producing a first voltage value;

a second power source for producing a second voltage value lower than the first voltage value; and a power source change device for changing the first power source to the second power source based on a control signal output from the motor stop controller;

wherein the motor stop controller decreases the first voltage value added to the motor rotating at a constant speed to the second voltage value through the power source change device when the stop instruction occurs and executes a stop control process of the motor by 2-phase excitation.

2. The motor stop control device according to claim 1, wherein the motor is a stepping motor with four excitation phases.

3. The motor stop control device according to claim 2, wherein the gaming machine conducts the stop instruction to stop the reel, and wherein the stop control process includes a stop process for conducting a preparation to stop a predetermined symbol of the reel, a power source change process for changing the first power source with the first voltage value to the second power source with the second voltage value through the power source change device, and an excitation process for conducting the 2-phase excitation of the stepping motor.

4. The motor stop control device according to claim 3, wherein the power source change process is executed after the stop process is terminated and before the excitation process is started.

5. The motor stop control device according to claim 4, wherein the excitation process is executed while utilizing the second power source changed by the power source change process.

6. A gaming machine comprising:

a reel on which a plurality of symbols are formed;

a motor stop control device having a motor with a plurality of excitation phases to rotate the reel and a motor stop controller for stopping the motor based on a stop instruction;

the motor stop control device comprising:

a first power source for producing a first voltage value;

a second power source for producing a second voltage value lower than the first voltage value; and a power source change device for changing the first power source to the second power source based on a control signal output from the motor stop controller;

wherein the motor stop controller decreases the first voltage value added to the motor rotating at a constant speed to the second voltage value through the power source change device when the stop instruction occurs and executes a stop control process of the motor by 2-phase excitation.

* * * * *